(12) United States Patent
Tanaka et al.

(10) Patent No.: US 11,391,592 B2
(45) Date of Patent: Jul. 19, 2022

(54) DISPLAY SYSTEM FOR AUGMENTED REALITY ROUTE SECTION DETERMINATION

(71) Applicant: PANASONIC INTELLECTUAL PROPERTY MANAGEMENT CO., LTD., Osaka (JP)

(72) Inventors: Akira Tanaka, Osaka (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 253 days.

(21) Appl. No.: 16/829,529

(22) Filed: Mar. 25, 2020

(65) Prior Publication Data
US 2020/0309554 A1 Oct. 1, 2020

(30) Foreign Application Priority Data

Mar. 27, 2019 (JP) .............................. JP2019-061463

(51) Int. Cl.
| | | |
|---|---|---|
| *G01C 21/36* | (2006.01) | |
| *G06T 11/20* | (2006.01) | |
| *G08G 1/0968* | (2006.01) | |
| *B60R 1/00* | (2022.01) | |
| *G01C 21/26* | (2006.01) | |

(52) U.S. Cl.
CPC .............. *G01C 21/365* (2013.01); *B60R 1/00* (2013.01); *G01C 21/265* (2013.01); *G06T 11/203* (2013.01); *G08G 1/096861* (2013.01); *B60R 2300/205* (2013.01); *B60R 2300/304* (2013.01)

(58) Field of Classification Search
CPC ...... G01C 21/365; G01C 21/265; B60R 1/00; B60R 2300/205; B60R 2300/304; G06T 11/203; G08G 1/096861
See application file for complete search history.

(56) References Cited

U.S. PATENT DOCUMENTS 6,304,818 B1 * 10/2001 Kamiya ................. G01C 21/30
701/520
2005/0058155 A1 * 3/2005 Mikuriya ............. H04Q 3/0062
370/474

(Continued)

FOREIGN PATENT DOCUMENTS

| JP | 07-257228 | 10/1995 |
|---|---|---|
| JP | 2018-045103 | 3/2018 |
| JP | 2018-140714 | 9/2018 |

OTHER PUBLICATIONS

English Language Translation of Office Action from China National Intellectual Property Administration (CNIPA) in Chinese Patent Application No. 202010218411.3, dated Oct. 13, 2021.

(Continued)

*Primary Examiner* — Terrell M Robinson
(74) *Attorney, Agent, or Firm* — Greenblum & Bernstein, P.L.C.

(57) ABSTRACT

A display apparatus of the present disclosure determines whether or not a route section is a linear section on the basis of positional relationship among nodes within the route section including three or more nodes, and, for a route section which is determined to be a linear section, forms and displays a line connecting a start node with a terminal node of the route section as an AR route.

5 Claims, 11 Drawing Sheets

(56) References Cited

U.S. PATENT DOCUMENTS

| | | | | |
|---|---|---|---|---|
| 2007/0024624 A1* | 2/2007 | Poppen | ................... | G06T 9/20 |
| | | | | 345/441 |
| 2008/0247645 A1* | 10/2008 | Vogt | ................... | G06T 11/203 |
| | | | | 382/173 |
| 2014/0297181 A1* | 10/2014 | Kondo | ............... | G08G 1/09626 |
| | | | | 701/532 |
| 2018/0292229 A1* | 10/2018 | Maruyama | ......... | G02B 27/0101 |
| 2019/0196187 A1 | 6/2019 | Kasazumi et al. | | |
| 2019/0333481 A1 | 10/2019 | Hato et al. | | |

OTHER PUBLICATIONS

English Language Translation of Office Action from China National Intellectual Property Administration (CNIPA) in Chinese Patent Application No. 202010218411.3, dated May 11, 2022.

* cited by examiner

DISPLAY SYSTEM FOR AUGMENTED REALITY ROUTE SECTION DETERMINATION

TECHNICAL FIELD

The present disclosure relates to a display system to be used as, for example, an in-vehicle display system.

BACKGROUND ART

As a display apparatus, a head-up display (hereinafter, also referred to as an HUD) is known. The HUD can realize so-called AR (Augmented Reality) by projecting an image on a translucent display medium and presenting to a user this image so as to be superimposed on an object which can be seen through the display medium.

An in-vehicle HUD includes a display apparatus of a type which presents to a driver, information which supports driving, or the like, in front of a windshield as a virtual image which can be seen so as to be superimposed on actual scenery. This type of display apparatus is disclosed in, for example, PTL 1, PTL 2, or the like.

The in-vehicle HUD includes an H-ID which displays an AR route as a virtual image. Display of an AR route is disclosed in, for example, PTL 3, or the like. The AR route is a direction in which a driver should go, displayed on a road in a band shape.

CITATION LIST

Patent Literature

PTL 1
Japanese Patent Application Laid-Open No. H7-257228
PTL 2
Japanese Patent Application Laid-Open No. 2018-045103
PTL 3
Japanese Patent Application Laid-Open No. 2018-140714

SUMMARY OF INVENTION

Technical Problem

In practice, an AR (Augmented Reality) route is created using map information of a navigation system. Specifically, first, the navigation system searches for a route to a destination, and selects coordinates (nodes, links) corresponding to the route among coordinates of roads (nodes, links) included in the map information. Then, a display apparatus forms an AR route on the basis of information of the selected nodes and links and projects the formed AR route on a front windshield as a virtual image.

Here, the coordinates of the nodes and the links refer to coordinates of feature points such as, for example, coordinates of intersections and shape interpolating coordinates, in other words, discontinuous coordinates. Because the AR route is formed using discontinuous coordinates in this manner, there are problems that (1) although a route is a linear road, the route looks bent in route display, (2) a route of a curve looks a broken line in route display, or the like.

For example, while, in a navigation screen which displays a route on a dedicated small monitor, a bent route, or the like, is less likely to provide a feeling of strangeness to a driver, because the AR route is displayed on a field of view of driving of the driver, an unnatural bent route, or the like, provides a feeling of strangeness to the driver. That is, in display of the AR route, if the AR route does not match a shape of a route on which a subject vehicle is to travel, the driver experiences a great feeling of strangeness.

The present disclosure has been made in view of the above-described points, and provides a display system which can display an AR route which matches a shape of a route on which a subject vehicle is to travel without providing a feeling of strangeness.

Solution to Problem

A display system according to one aspect of the present disclosure is a system for displaying an AR (Augmented Reality) route which is a virtual image so as to be superimposed on a real image seen by a user, the display system including:

an AR route former that forms the AR route; and
a display that displays the AR route as a virtual image,
in which the AR route former determines whether or not a route section is a linear section on a basis of positional relationship of nodes within the route section including three or more nodes, and
for the route section which is determined to be the linear section, the AR route former forms a line which connects a start node of the route section with a terminal node of the same, as the AR route.

Advantageous Effects of Invention

According to the present disclosure, it is possible to display an AR route which matches a shape of a route on which a subject vehicle is to travel without providing a feeling of strangeness.

BRIEF DESCRIPTION OF DRAWINGS

FIG. 12A illustrates node positions, and FIG. 12B illustrates the AR route;

FIG. 13A illustrates shifting of the node positions, and FIG. 13B illustrates the shifted AR route.

DESCRIPTION OF EMBODIMENT

An embodiment of the present invention will be described below with reference to the accompanying drawings.

<1> Schematic Configuration of Display Apparatus

Figure 1:
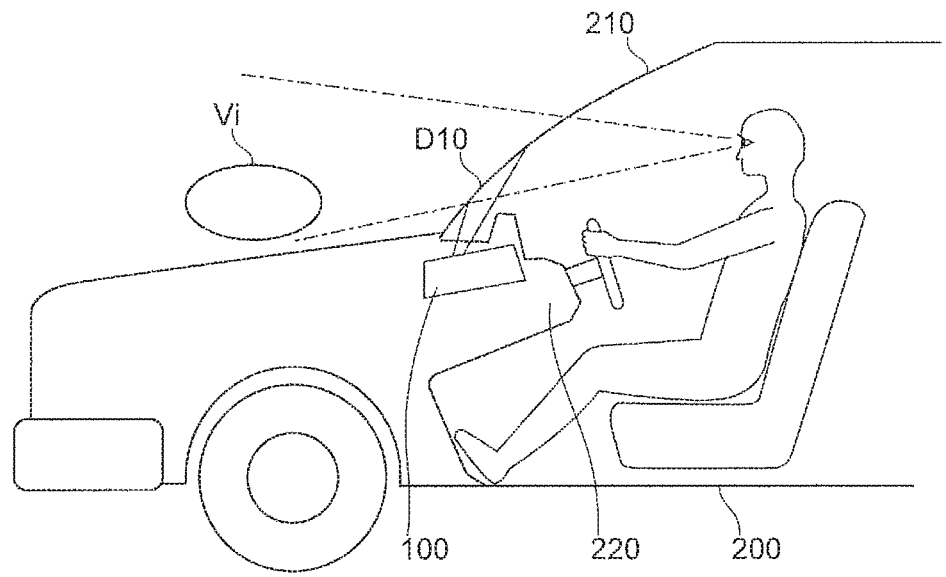
FIG. 1 illustrates an example where a display apparatus according to an embodiment is mounted on a vehicle.

FIG. 1 illustrates an example where display apparatus 100 according to an embodiment of the present disclosure is mounted on vehicle 200.

Display apparatus 100 in the present embodiment is embodied as an in-vehicle head-up display (HUD). Display apparatus 100 is attached near an upper face of dashboard 220 of vehicle 200.

Display apparatus 100 projects light on region D10 within a field of view of a driver, indicated with a dashed-dotted line, in windshield (so-called, front windshield) 210. While part of the projected light passes through windshield 210, the other part of the light is reflected by windshield 210. This reflected light heads for eyes of the driver. The driver perceives the reflected light which has entered the eyes as virtual image Vi which looks like an image of an object located on an opposite side (outside of vehicle 200) of windshield 210 against a background of a real object seen through windshield 210.

Figure 2:
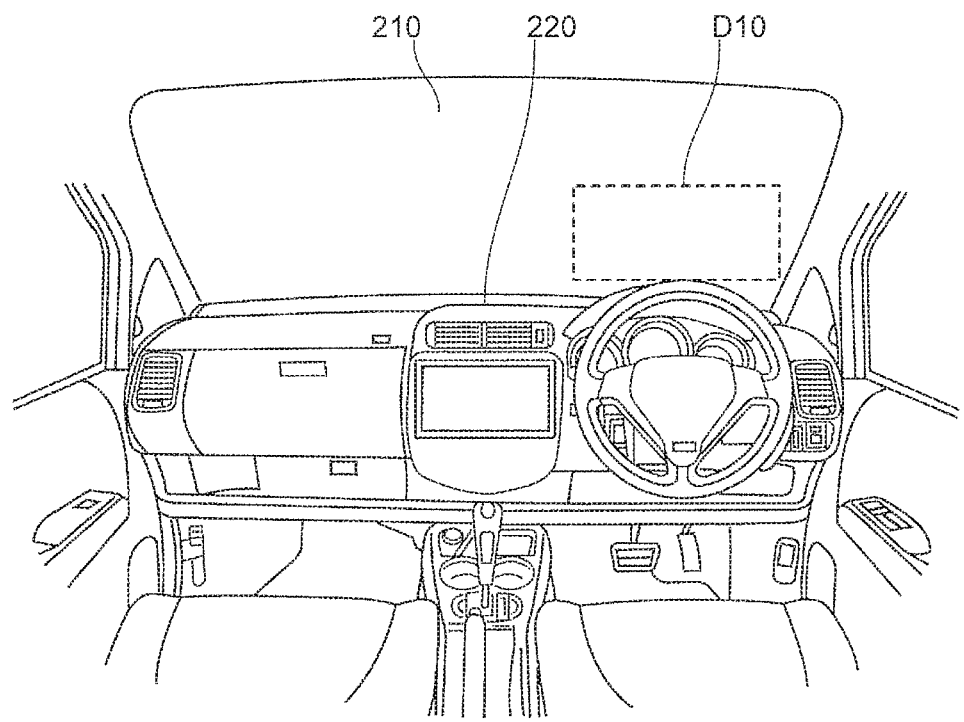
FIG. 2 illustrates an example of a region in which light is projected by the display apparatus in the embodiment.

FIG. 2 illustrates an example of region D10 which is a region where light is projected by display apparatus 100 in the present embodiment.

Region D10 is located at a lower portion on the driver side of windshield 210, for example, as indicated as a region enclosed by a dashed line in FIG. 2. Display apparatus 100 attached at dashboard 220 projects an image on windshield 210 by projecting light on region D10 as illustrated in FIG. 1. By this means, virtual image Vi which looks like an image of an object located outside of vehicle 200 from the driver is generated.

Note that an image projected on windshield 210 can be perceived by the driver in virtual image Vi as if it were located at different distances depending on vertical positions within region D10. For example, in the examples in FIG. 1 and FIG. 2, because region D10 is located at a portion lower than height of the eyes of the driver, an image located at a portion lower in region D10 can be perceived as if it were an object located closer from the driver in virtual image Vi, while an object located at a portion higher within the image projected on region D10 can be perceived as if it were an object located farther from the driver in virtual image Vi. Principle of such perception is explained by one type of geometric perspective (vertical perspective).

Figure 3:
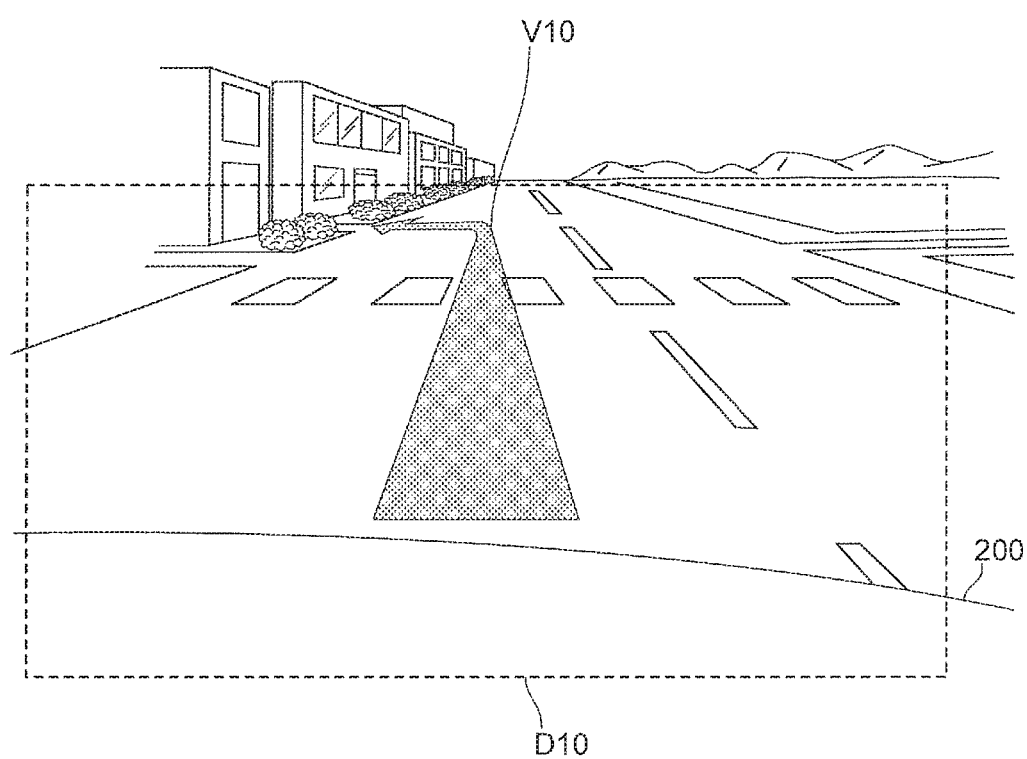
FIG. 3 illustrates an example which a virtual image is displayed so as to be superimposed on foreground.

FIG. 3 illustrates an example of a virtual image generated by display apparatus 100 in the present embodiment, and an example where this virtual image is superimposed on scenery ahead of vehicle 200 seen from the driver of vehicle 200 which is traveling.

FIG. 3 schematically illustrates part of scenery within a field of view of a driver (not illustrated) who is driving vehicle 200 as a whole. Note that a frame indicated with a dashed line indicating region D10 in which an image from display apparatus 100 is projected is illustrated for the purpose of illustration of the present embodiment, and neither exists nor is perceived by the driver. Reference numeral 200 indicates a hood which is part of vehicle 200.

Further, an arrow image with reference numeral V10 indicates an AR (Augmented Reality) route which is an example of virtual image Vi generated by display apparatus 100 and perceived by the driver.

As illustrated in FIG. 3, AR route V10 which is a virtual image is displayed so as to be superimposed on scenery actually seen within a field of view of the driver. In practice, AR route V10 is displayed so as to be superimposed on a road. By this means, the driver is guided to travel on a band-like region indicated by AR route V10.

Figure 4:
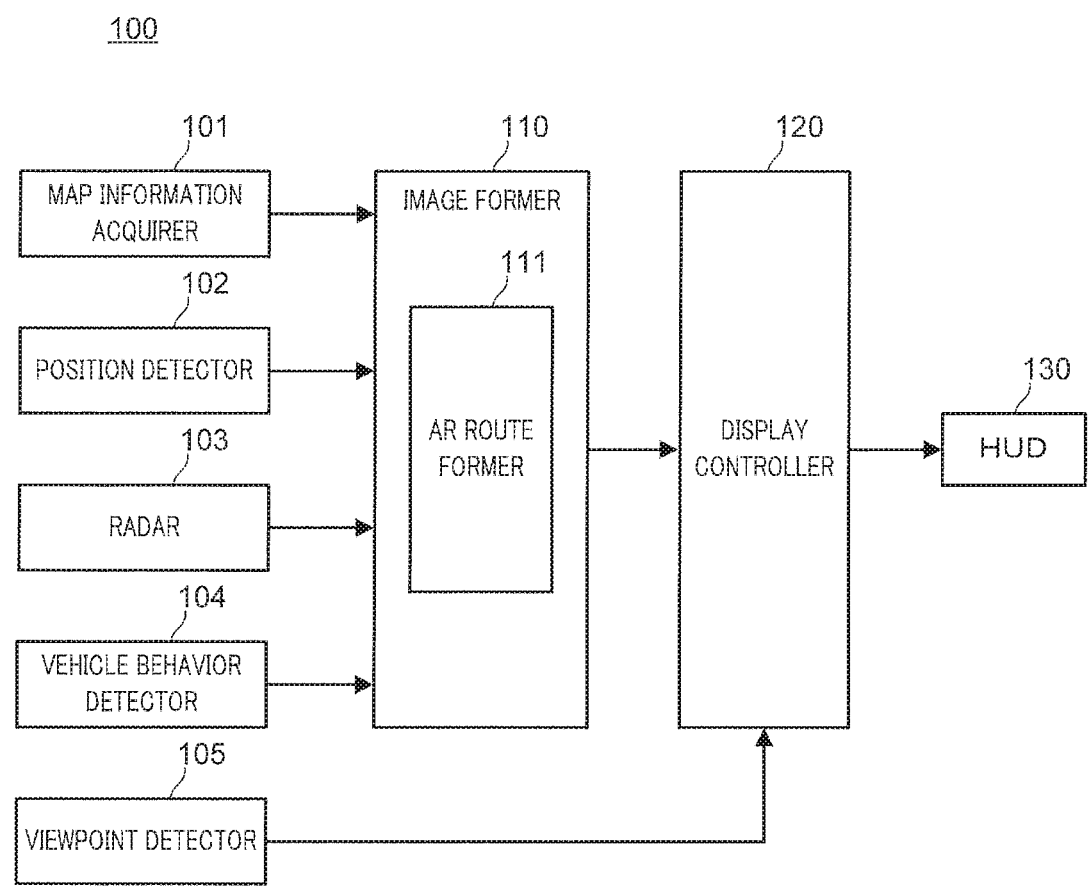
FIG. 4 is a block diagram illustrating a configuration example of a display apparatus.

FIG. 4 is a block diagram illustrating a configuration example of display apparatus 100.

Display apparatus 100 includes map information acquirer 101, position detector 102, radar 103, vehicle behavior detector 104, viewpoint detector 105, image former 110, display controller 120 and HUD 130.

Map information acquirer 101 acquires map information including information which expresses landforms, road shapes, or the like, with coordinates in an absolute coordinate system. The map information acquired by map information acquirer 101 may be information stored in a map information storage medium mounted on vehicle 200 or may be acquired through communication with an external apparatus. In a case of the present embodiment, map information acquirer 101, which is a so-called navigation system, acquires a course from a current location to a destination. Map information acquirer 101 outputs the map information and course information to image former 110.

Position detector 102, which is embodied by a GPS receiver, a gyro scope, a vehicle speed sensor, or the like, detects a current location of subject vehicle 200.

Radar 103 detects whether or not there is an object and a distance to the object by emitting a radio wave or laser light toward a region ahead of subject vehicle 200 and receiving the reflected wave. Note that display apparatus 100 may include other detection apparatuses such as a camera and an infrared sensor in addition to radar 103 to detect an object in a peripheral region.

Vehicle behavior detector 104, which is embodied by a gyro scope, a suspension stroke sensor, a vehicle height sensor, a vehicle speed sensor, an acceleration sensor, or the like, detects a physical amount indicating behavior of the vehicle.

Viewpoint detector 105 takes an image of the eyes of the driver with, for example, an infrared camera, and measures coordinates of positions of the eyes of the driver in a vehicle coordinate system from the taken image of the eyes through image processing. The detection result by viewpoint detector 105 is output to display controller 120.

Image former 110 forms an image which becomes a basis of virtual image Vi on the basis of input signals from map information acquirer 101, position detector 102, radar 103 and vehicle behavior detector 104. Image former 110 includes AR route former 111. AR route former 111 forms an image which becomes a basis of an AR route which is a virtual image on the basis of input signals from map information acquirer 101 and position detector 102.

Display controller 120 displays virtual image Vi in region D10 of the windshield by controlling a light source, a scanner, a screen driver, or the like, which constitute HUD 130 on the basis of the image formed by image former 110 and viewpoint information.

<2> AR Route Formation

Before characteristic AR route forming processing according to the present embodiment is described, typical route formation using map information will be described.

Note that functions of AR route former 111 which will be described below may be realized by a CPU copying a program stored in a storage apparatus to a RAM, sequentially reading out commands included in the program from the RAM and executing the commands. In other words, the processing of AR route former 111 which will be described below may be realized by a program.

AR route former 111 inputs road map data from map information acquirer 101. In the road map data, a minimum unit indicating a road section is referred to as a link. That is, each road is constituted with a plurality of links set for each predetermined road section. Points which connect the links are referred to as nodes, and each of the nodes has position information (coordinate information). Further, points called shape interpolating points may be set between nodes within a link. Each of the shape interpolating points also has position information (coordinate information) in a similar manner to the nodes. A link shape, that is, a shape of a road is determined by position information of the nodes and the shape interpolating points.

The node is an intersection, a branch point, a junction, or the like, and AR route former 111 inputs coordinate information of the intersection, the branch point, the junction, or the like, as information of the nodes. Further, AR route former 111 also inputs coordinate information of the shape interpolating points as described above.

Each link is constituted with respective pieces of data such as a link length indicating a length of the link, shape information of the link, coordinates (latitude, longitude) of a start node and a terminal node of the link, road name, a road type, a road width, a road attribute, a one-way attribute, the number of lanes, presence or absence of a right-turn-only or left-turn-only lane, and the number of the right-turn-only or left-turn only lanes as attribute information of the link.

AR route forming processing by AR route former 111 of the present embodiment will be described next. Information of the nodes and the links indicating the traveling route of the subject vehicle as described above is input to AR route former 111.

<2-1> Line Correction

Figure 5A:
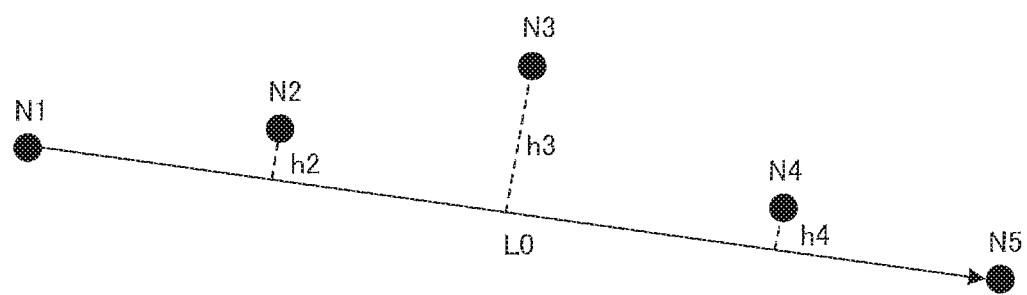
FIGS. 5A to 5C explain AR route formation in the embodiment.
Figure 5B:
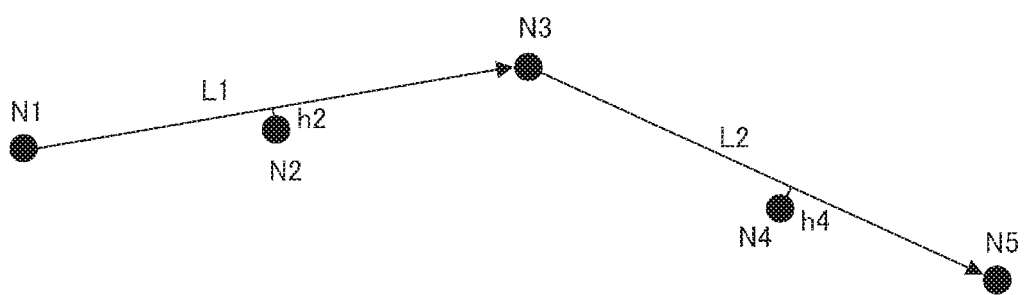
Figure 5C:
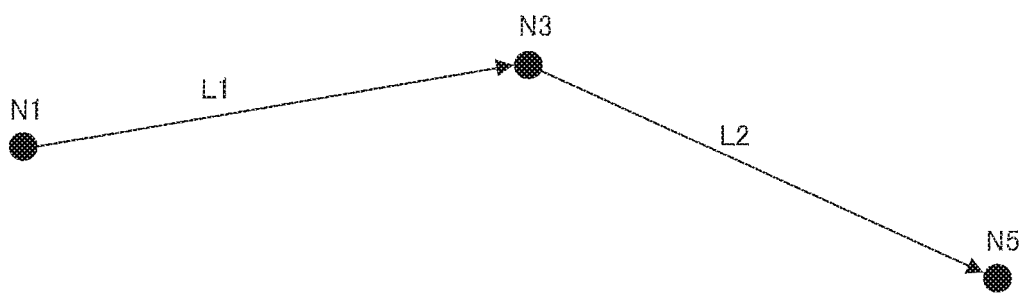

FIGS. 5A to 5C explain AR route formation in the present embodiment. FIGS. 5A to 5C illustrate nodes N1 to N5 within a route section. Therefore, in a conventional AR route forming processing, the AR route which sequentially connects N1, N2, N3, N4 and N5 is formed.

Meanwhile, in AR route forming processing in the present embodiment, first, it is determined whether or not a section from N1 to N5 is a linear section, and, in a case where it is determined that the section is a linear section, line L0 which connects start node N1 with terminal node N5 of the section is formed as the AR route and displayed. On the other hand, in a case where it is determined that the section is not a linear section, dividing processing or curve correction processing which will be described later are performed.

The processing will be specifically described. In the AR route forming processing in the present embodiment, first, as illustrated in FIG. 5A, line L0 which connects section start node N1 with section terminal node N5 within a route section to be subjected to determination on whether or not the section is a linear section is formed.

Then, distances h2, h3 and h4 between line L0 and other nodes N2, N3 and N4 included in the route section are calculated.

Next, AR route former 111 compares distances h2, h3 and h4 with a predetermined threshold. In a case where distances h2, h3 and h4 are all equal to or less than the threshold, AR route former 111 creates an AR route by connecting the section between node N1 with node N5 with one line L0. On the other hand, in a case where there is a distance greater than the threshold among distances h2, h3 and h4, AR route former 111 divides a route section at a node to which the distance is the greatest as a dividing point. In a case of the examples in FIGS. 5A to 5C, because distance h3 to node N3 is the greatest, the route section is divided at node N3 as the dividing point.

Then, as illustrated in FIG. 5B, processing of determining whether or not the section is a linear section is repeated in a similar manner as described above using the dividing point as an end point and a start point of the section. Specifically, line L1 which connects section start node N1 with section terminal node N3 is formed within the route section. In a similar manner, line L2 which connects section start node N3 with section terminal node N5 is formed within the route section. Then, distance h2 between line L1 and another node N2 included within the route section is calculated. In a similar manner, distance h4 between line L2 and another node N4 included in the route section is calculated. Then, distance h2 is compared with the threshold. In a similar manner, distance h4 is compared with the threshold. In an example of the drawing, because distance h2 is smaller than the threshold, as illustrated in FIG. 5C, an AR route is created by connecting a section between node N1 and node N3 with one line L. In a similar manner, because distance h4 is smaller than the threshold, as illustrated in FIG. 5C, an AR route is created by connecting a section between node N3 and node N5 with one line L2.

In short, line correction processing in the present embodiment is processing for creating a line while excluding (ignoring) nodes which do not largely deviate from a line connecting a start node with a terminal node of a section. By this means, it is possible to prevent an AR route from being unnaturally bent due to a way of setting of coordinates of the nodes. For example, it is possible to prevent inconvenience that an AR route is slightly bent for each intersection due to the coordinate of the node being set at a coordinate of the center of the intersection, although the road is actually a linear road.

Figure 6:
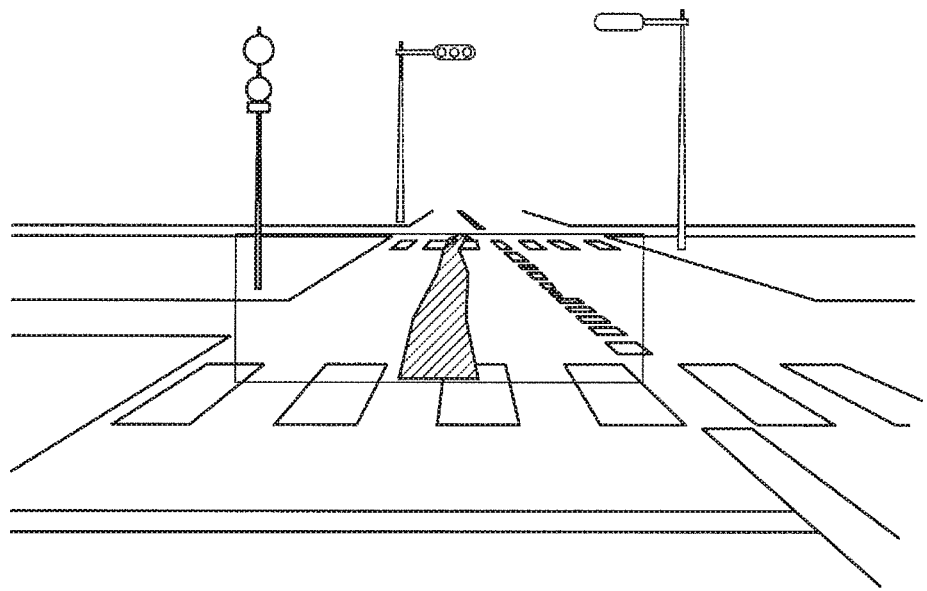
FIG. 6 illustrates a display example of an AR route in a case where line correction processing of the embodiment is not applied.
Figure 7:
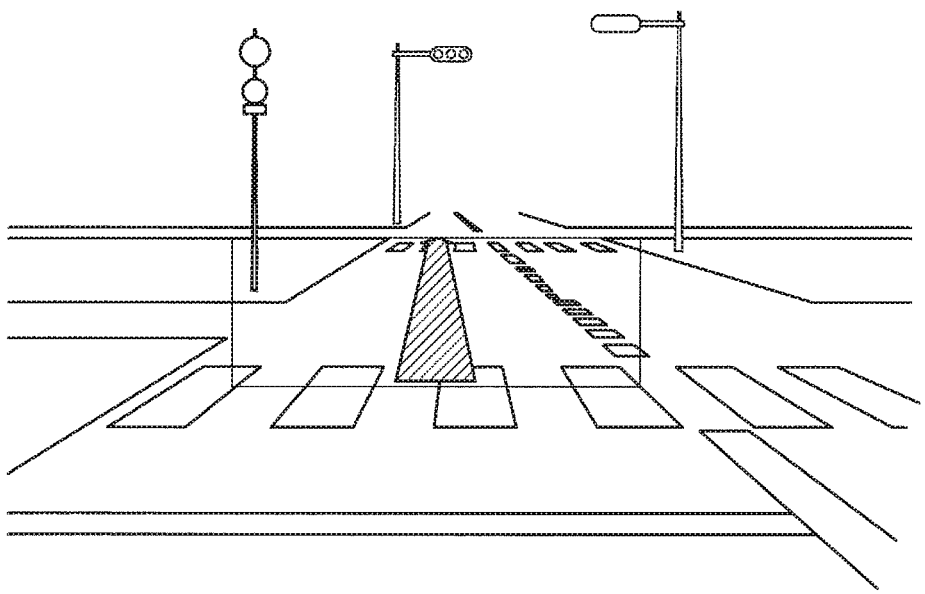
FIG. 7 illustrates a display example of an AR route in a case where the line correction processing of the embodiment is applied.

FIG. 6 illustrates a display example of the AR route in a case where the line correction processing of the present embodiment is not applied. It can be seen from this drawing that the AR route is slightly bent at the intersection although the road is a linear road. FIG. 7 illustrates a display example of the AR route in a case where the line correction processing of the present embodiment is applied. It can be seen from this drawing that a bent portion of the AR route at the intersection disappears.

Figure 8:
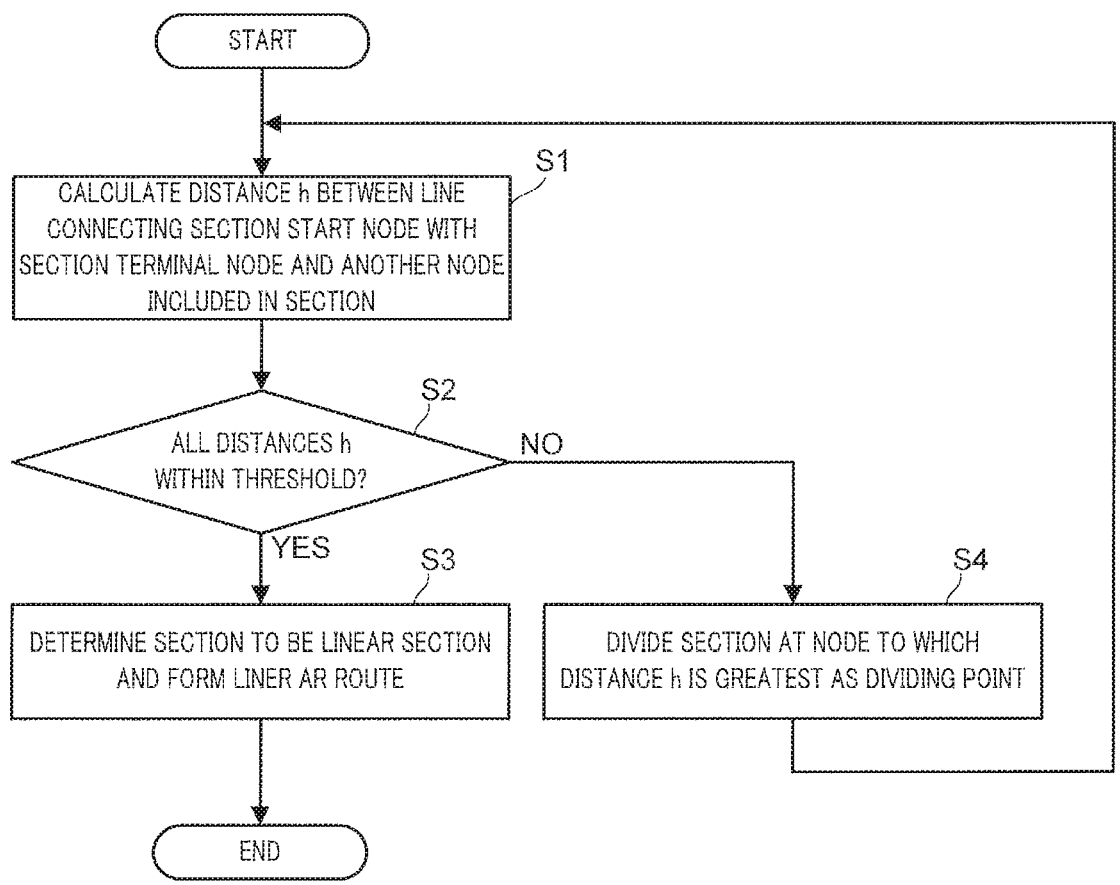
FIG. 8 illustrates a flowchart of flow of the line correction processing of the AR route in the embodiment.

FIG. 8 illustrates a flowchart of flow of the line correction processing of the AR route in the present embodiment.

AR route former 111 first calculates distance h between a line connecting the start node with the terminal node and another node included in the section in step S1. That is, AR route former 111 calculates distances h2, h3 and h4 between line L0 connecting section start node N1 with section terminal node N5 and other nodes N2, N3 and N4 included in the section in the example in FIG. 5A.

AR route former 111 calculates whether or not all distances h2, h3 and h4 are equal to or less than a threshold in the subsequent step S2. In a case where a positive result is obtained in step S2 (step S2: Yes), the processing transitions to step S3, and the section is determined to be a linear section, and an AR route is formed. In the example in FIG. 5A, line L0 is set as the AR route.

Meanwhile, in a case where a negative result is obtained in step S2 (step S2: No), the processing transitions to step S4, and the section is divided at a node to which distance h is the greatest as a dividing point. That is, in the example in FIG. 5B, the route section is divided at node N3 as the dividing point. The processing of AR route former 111 returns to step S1 again after the processing in step S4. This processing in step S1 corresponds to the processing of calculating distances h2 and h4 in the example in FIG. 5B.

In this manner, AR route former 111 divides the section until there is no longer a node to which the distance is equal to or greater than the threshold by recursively repeating the processing of step S1-S2-S4-S1 until a positive result can be obtained in step S2. Then, when such a node no longer exists, the section is determined to be a linear section, and the processing in step S3 is performed to form a liner AR route within the linear section.

<2-2> Curve Interpolation

AR route former 111 in the present embodiment performs curve interpolation on the route section which is determined to be a non-linear section.

Figure 9:
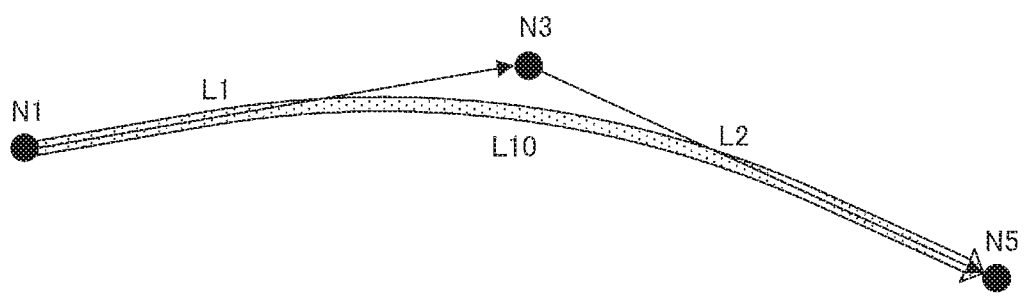
FIG. 9 illustrates an example of curve interpolation in the embodiment.

For example, curve interpolation as illustrated in FIG. 9 is performed on a non-linear section subjected to the line correction (which can be also referred to as smoothing of a line) as described in section <2-1>. In the example in FIG. 9, because line L1 and line L2 are connected while being bent via node N3 which is the dividing point, a section from N1-N3-N5 is not a linear section. In practice, in most every case, the section from N1-N3-N5 is not a bent road, but a curve. In view of this, AR route former 111 forms curve L10 by performing curve interpolation on the section from N1-N3-N5 and outputs this curve L10 as the AR route.

At this time, AR route former 111 performs curve interpolation using nodes included in the section as control points. In the example in FIG. 9, curve L10 is formed by curve interpolation being performed using nodes N1, N3 and N5 as control points.

Here, the nodes are not always arranged so as to make a clear curve, and there is a case where a curve shape having distortion is made if curve interpolation is performed so that the curve passes through all nodes. In view of this, in the present embodiment, curve L10 without distortion is formed by interpolation being performed using a B-spline curve. However, the curve interpolation is not limited to interpolation using a B-spline curve.

Note that, while a case has been described here where curve interpolation is performed on a section which is not a linear section after the line correction as described in section <2-1> has been performed, the present invention is not limited to this, and, in short, it is only necessary to perform curve interpolation on the route section which is determined to be a non-linear section using nodes included in the section as the control points and output a curve subjected to the curve interpolation as the AR route.

Figure 10:
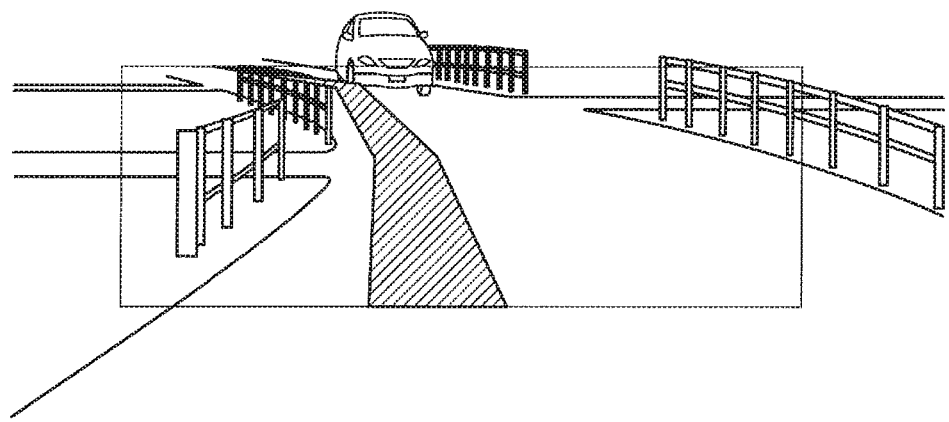
FIG. 10 illustrates a display example of an AR route in a case where curve interpolation processing of the embodiment is not applied.
Figure 11:
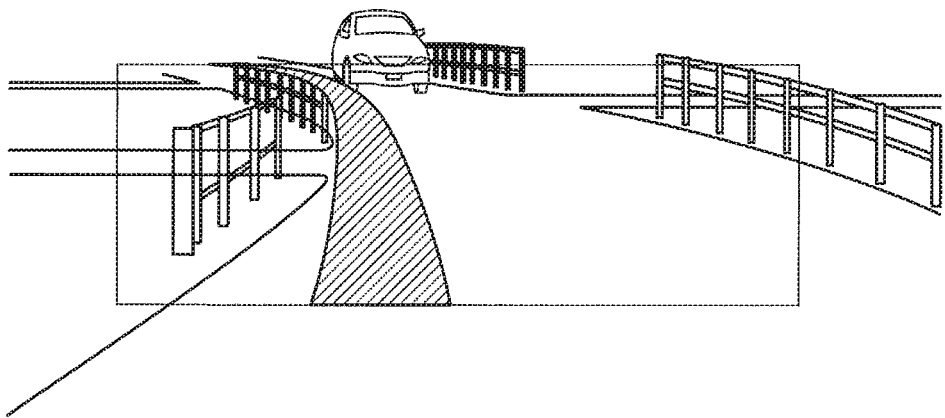
FIG. 11 illustrates a display example of an AR route in a case where the curve interpolation processing of the embodiment is applied.

FIG. 10 illustrates a display example of the AR route in a case where the curve interpolation processing of the present embodiment is not applied. It can be seen from this drawing that the AR route becomes a broken line although an actual road is curved. FIG. 11 illustrates a display example of the AR route in a case where the curve interpolation processing of the present embodiment is applied. It can be seen from this drawing that the AR route having a curved shape along the curve can be displayed.

<2-3> Processing of Shifting AR Route on the Basis of Lane Information

As described above, the AR route is created on the basis of the nodes and the links included in the road map data. However, because the coordinate information included in the nodes and the links are often coordinates of the centers of the roads, if the AR route is formed using the information as it is, there is a case where an AR route which provides a feeling of strangeness is displayed. Particularly, an AR route which provides a feeling of strangeness is highly likely to be displayed at positions such as an intersection and a branch point, where a plurality of roads intersect.

In view of this, in the present embodiment, the AR route is formed by shifting a coordinate of the node included in the road map data to a lane on which the subject vehicle is to travel on the basis of the lane information. By this means, on the basis of the lane information, it becomes possible to display an AR route which does not provide a feeling of strangeness, shifted on the side of the lane on which the subject vehicle travels. For comparison, because the AR route is formed by connecting the nodes, shifting the coordinate of the node is equivalent to shifting the AR route. Therefore, in the following description, it is possible to read shifting the coordinate of the node as shifting the AR route, inversely, it is possible to read shifting the AR route as shifting the coordinate of the node.

Figure 12A:
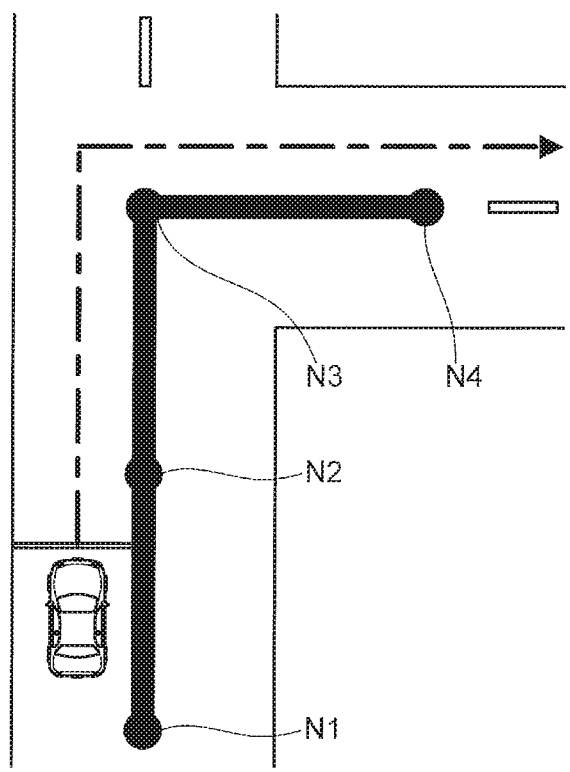
FIGS. 12A and 12B explain display of the AR route which is conventionally performed.
Figure 12B:
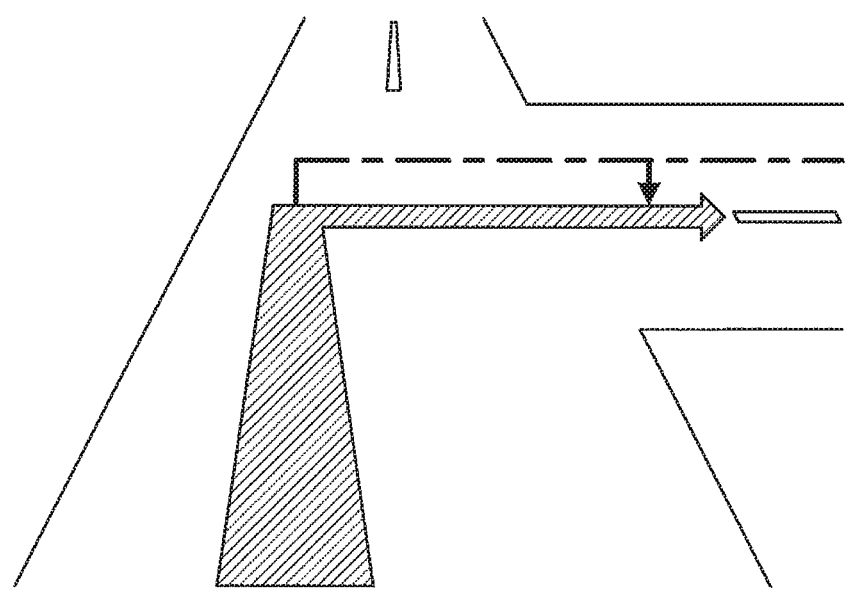

FIGS. 12A and 12B explain conventional display of an AR route. As illustrated in FIG. 12A, a case is assumed where the subject vehicle is travelling on a road which has one lane each way and which has a center line, and turns right at an intersection ahead. At this time, coordinates of nodes N1 to N4 are coordinates on the center line.

FIG. 12B illustrates the AR route formed and displayed on the basis of nodes N1 to N4 in FIG. 12A. As can be seen from FIG. 12B, because, in the conventional AR route, the start point is set so as to match a traveling position of the subject vehicle, while a portion ahead of the subject vehicle is displayed without providing a feeling of strangeness, after the subject vehicle passes through an intersection, the AR route is on a center line. That is, the AR route is displaced in the center line direction from a lane on which the subject vehicle is to actually travel.

Figure 13A:
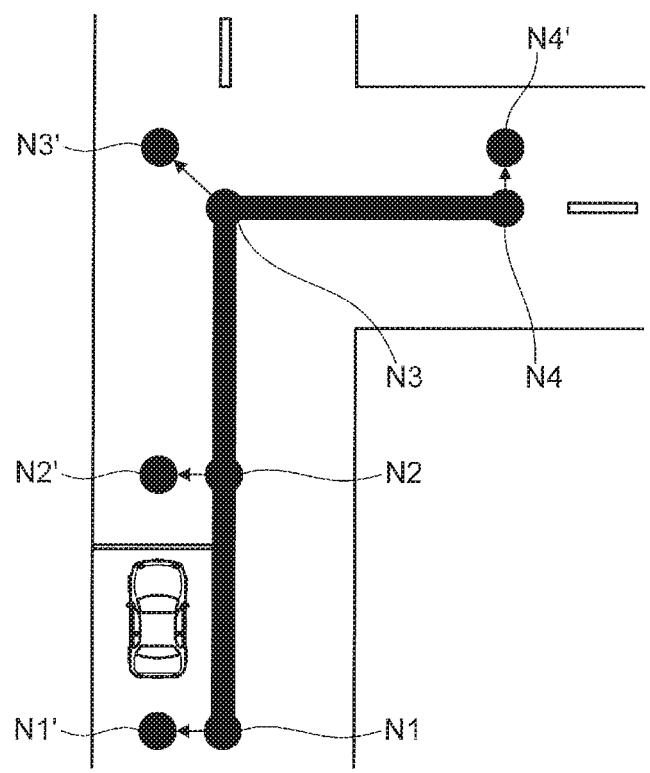
FIGS. 13A and 13B explain display of an AR route in the embodiment.
Figure 13B:
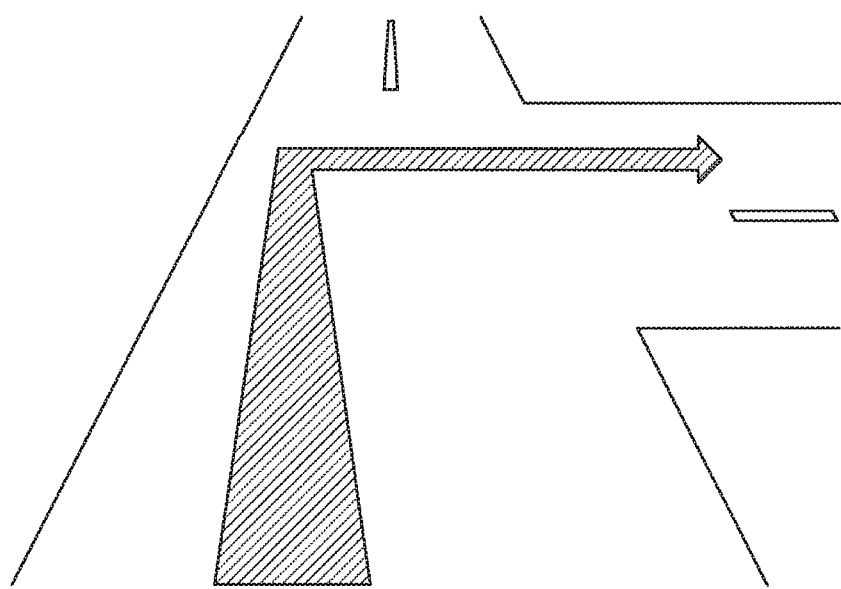

FIGS. 13A and 13B explain display of the AR route in the present embodiment. In the present embodiment, as illustrated in FIG. 13A, nodes N1', N2', N3' and N4' are calculated by coordinates of nodes N1, N2, N3 and N4 on the center line being shifted to the lane on which the subject vehicle is to travel, and the AR route is formed and displayed using nodes N1', N2', N3' and N4'.

FIG. 13B illustrates the AR route formed and displayed on the basis of nodes N1', N2', N3' and N4' in FIG. 13A. As can be seen from FIG. 13B, the AR route in the present embodiment is displayed on the lane on which the subject vehicle is to travel even after the subject vehicle passes through the intersection. As a result, it is possible to display the AR route without providing a feeling of strangeness.

Here, a specific example of shifting of the AR route according to the present embodiment will be described here.

In a case where the road has three lanes each way and a lane on which the subject vehicle is to travel is the leftmost lane, the node positions are shifted on the lane of the subject vehicle by a "lane width (for example, 3.25 m)×(the number of lanes (in this example, 3)-0.5)". This processing is processing to address a situation where the nodes are set on the center line.

In this manner, in the AR route shifting processing of the present embodiment, a node set at the center of the road is shifted on the lane on which the subject vehicle is to travel. In the present embodiment, the AR route is shifted to the center of the lane on which the subject vehicle is to travel.

Then, effects by the AR route shifting processing according to the present embodiment will be described using FIGS. 14A and 14B.

Figure 14A:
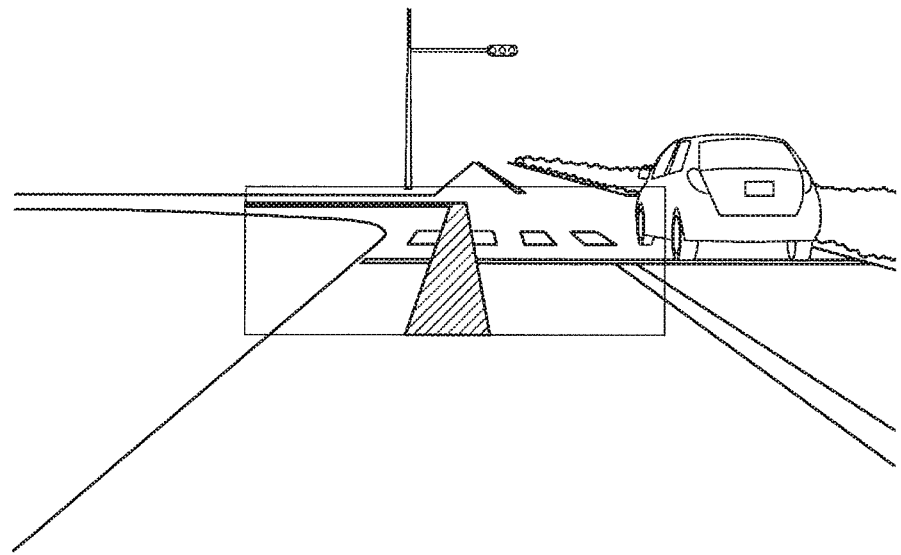
FIG. 14A illustrates an example where the AR route is not shifted.
Figure 14B:
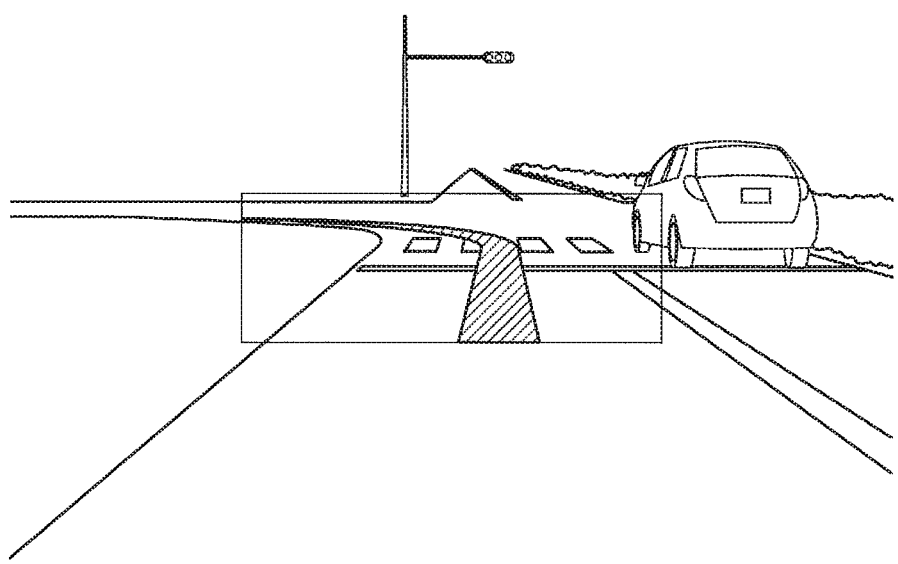
FIG. 14B illustrates an example where AR route shifting processing of the present embodiment is applied.

FIGS. 14A and 14B illustrate display of the AR route in a case where the subject vehicle turns left at an intersection ahead. FIG. 14A illustrates an example where the AR route is not shifted, and FIG. 14B illustrates an example where the AR route shifting processing of the present embodiment is applied. As can be clear through comparison between these drawings, while the AR route in FIG. 14A is displayed near the center of the road on which the subject vehicle is not to travel after the subject vehicle passes through the intersection, the AR route in FIG. 14B is displayed on the lane on which the subject vehicle is to travel even after the subject vehicle passes through the intersection without a feeling of strangeness being provided.

In this manner, by performing the AR route shifting processing of the present embodiment, even if the node position at the intersection is displaced to a left side or right side from an extension of the traveling lane, it is possible to display the AR route along the lane on which the subject vehicle is to travel without providing a feeling of strangeness.

<3> Conclusion

As described above, according to the present embodiment, as described in section <2-1>, whether or not the route section is a linear section is determined on the basis of positional relationship of the nodes within the route section including three or more nodes, and a line connecting a start node with a terminal node of the route section is formed and displayed as the AR route for the route section which is determined to be a linear section, so that it is possible to display the AR route which matches the shape of the route on which the subject vehicle is to travel without providing a feeling of strangeness while resolving inconvenience that the AR route looks bent although the road is a linear road.

Further, as described in section <2-2>, for the route section which is determined to be a non-linear section, by forming the AR route having a shape which is subjected to curve interpolation using the nodes included in the section as control points, it is possible to display the AR route which matches the shape of the route on which the subject vehicle is to travel without providing a feeling of strangeness.

Particularly, even a slight difference in orientation between links which seem linear roads when seen from above looks a large angle in display of the route like display of the AR route, which is obliquely seen. By performing the line correction and the curve interpolation in the above-described embodiment, it is possible to effectively resolve this problem.

While, in the above-described embodiment, a case has been described where the display apparatus of the present disclosure is applied to an in-vehicle HUD, the present disclosure is not limited to this, and the display apparatus of the present disclosure can be widely applied to display systems and apparatuses which display the AR route which is a virtual image so as to be superimposed on a real image which is seen by the user, in short.

While various embodiments have been described herein above, it is to be appreciated that various changes in form and detail may be made without departing from the spirit and scope of the invention(s) presently or hereafter claimed.

INCORPORATION BY REFERENCE

This application is entitled and claims the benefit of Japanese Patent Application No. 2019-061463, filed on Mar. 27, 2019, the disclosure of which including the specification, drawings and abstract is incorporated herein by reference in its entirety.

INDUSTRIAL APPLICABILITY

The display system of the present invention is suitable for, for example, a system including an in-vehicle HUD.

REFERENCE SIGNS LIST

100 Display apparatus
101 Map information acquirer
102 Position detector
103 Radar
104 Vehicle behavior detector
105 Viewpoint detector
110 Image former
111 AR route former
120 Display controller
130 HUD (Head-Up Display)
200 Vehicle
210 Windshield
220 Dashboard
N1, N2, N3, N4, N5 Node
h2, h3, h4 Distance
L0, L1, L2 Line
L10 Curve
Vi Virtual image

The invention claimed is:

1. A display system for displaying an AR (Augmented Reality) route which is a virtual image so as to be superimposed on a real image seen by a user, the display system comprising:
    a processor that forms the AR route; and
    a display that displays the AR route as the virtual image,
    wherein the processor determines whether or not a route section is a linear section on a basis of a positional relationship of nodes within the route section, the route section including three or more nodes,
    for the route section which is determined to be the linear section, the processor forms a line which connects a start node of the route section with a terminal node of the route section, as the AR route, and
    the processor divides the route section to be subjected to the determination at a node to which a distance is greatest as a dividing point, in a case where a node for which a distance to the line is greater than a predetermined threshold exists among the three or more nodes included in the route section to be subjected to the determination.

2. The display system according to claim 1, wherein the processor determines whether the route section is the linear section or not on a basis of a distance between the line which connects the start node with the terminal node within the route section and another node included in the route section.

3. The display system according to claim 2, wherein the processor determines that the route section is the linear section in a case where a distance between the line and all other nodes included in the route section is equal to or less than a predetermined threshold.

4. The display system according to claim 1, wherein for a route section which is determined to be a non-linear section, the processor forms the AR route having a shape subjected to curve interpolation using nodes included in the route section as control points.

5. A display apparatus which causes a driver to view the virtual image by projecting light on a windshield, the display apparatus comprising:
   the display system according to claim 1.

* * * * *